United States Patent [19]

Bachhuber et al.

[11] Patent Number: 5,036,318
[45] Date of Patent: Jul. 30, 1991

[54] MODULAR ISDN COMMUNICATION SYSTEM WITH FORMATION AND DISPLAY OF ERROR TEXTS

[75] Inventors: Gerhard Bachhuber, Wessling; Detlef Buhse, Munich, both of Fed. Rep. of Germany

[73] Assignee: Siemens Aktiengesellschaft, Berlin and Munich, Fed. Rep. of Germany

[21] Appl. No.: 303,804

[22] Filed: Jan. 27, 1989

Related U.S. Application Data

[63] Continuation-in-part of Ser. No. 63,068, Jun. 17, 1987, abandoned.

[30] Foreign Application Priority Data

Jul. 23, 1986 [DE] Fed. Rep. of Germany ....... 3624906
Sep. 30, 1986 [DE] Fed. Rep. of Germany ....... 3633193

[51] Int. Cl.$^5$ .............................................. H04B 3/00
[52] U.S. Cl. ................................ 340/825.16; 370/85.1
[58] Field of Search ................... 340/825.16, 825.17; 379/1, 2, 3, 4, 8, 9, 10, 12, 14, 279; 370/61, 62, 68.1, 85.1, 58.1, 10, 16; 371/12, 11, 14, 15.1; 364/200 MS

[56] References Cited

U.S. PATENT DOCUMENTS

| | | | |
|---|---|---|---|
| 4,023,142 | 5/1977 | Woessner | 371/15.1 |
| 4,451,916 | 5/1984 | Casper et al. | 370/10 |
| 4,703,325 | 10/1987 | Chamberlin et al. | 340/825.16 |
| 4,736,319 | 4/1988 | Das Gupta et al. | 379/279 |
| 4,771,420 | 9/1988 | Deschaine et al. | 370/58.1 |
| 4,817,092 | 3/1989 | Denny | 379/2 |
| 4,831,513 | 5/1989 | Kanazawa | 371/12 |
| 4,860,333 | 8/1989 | Bitzinger et al. | 379/279 |
| 4,868,744 | 9/1989 | Reinsch et al. | 371/12 |

Primary Examiner—Donald J. Yusko
Assistant Examiner—Dervis Magistre
Attorney, Agent, or Firm—Hill, Van Santen, Steadman & Simpson

[57] ABSTRACT

Error information are formed in respectively assigned dependability system sub-modules from error reports of program control modules in a job-oriented manner and are transmitted to a system dependability sub-module. These reports are compiled in the latter based on defined order and criteria. The records are then forwarded in a system dependability sub-module-associated data format to a signaling sub-module which is provided in an administration data server, a signaling distribution file and a signaling format file with whose assistance signaling information, from which error texts that can be output to display equipment are formed and assigned to the signaling sub-module.

12 Claims, 8 Drawing Sheets

| Runup | | | |
|---|---|---|---|
| DO_FOR_EVER | | | |
| Receive_Message | | | |
| Computer State | | | |
| active | | stand-by | |
| Case Event_Code | | Event_Code | |
| valid | else | Restart_SM | else |
| order processing active | Fault: Signal Exception no reaction necessary | no reaction necessary | Fault: Signal Exception no reaction necessary |

| EVT 1 | EVT 2 | EVT 3 | EVT 4 | EVT 5 | EVT 6 | EVT 7 | EVT 8 | EVT 9 |
|---|---|---|---|---|---|---|---|---|
| 1 | 2 | 3 | 4 | 5 | 6 | 7 | 8 | 9 |

MODULAR ISDN COMMUNICATION SYSTEM WITH FORMATION AND DISPLAY OF ERROR TEXTS

CROSS REFERENCE TO RELATED APPLICATION

This application is a continuation-in-part application of application Ser. No. 063,068, filed June 17, 1987, now abandoned.

BACKGROUND OF THE INVENTION

1. Field of the Invention

The present invention relates to modular communications systems, particularly ISDN communication systems each of which comprises a switching unit having a digital switching matrix and a central control device and comprising an administration data server which serves for the control of the system-oriented periphery and for the storing of system files, as well as comprising further program control modules constructed in a job-oriented manner, a system bus connecting all program control modules, program-control module-associated dependability modules and a dependability security dependability sub-module in the switching unit hierarchy which ranks higher over the program-control module-associated dependability system modules, and further comprising at least one output equipment for the display of errors.

2. Description of the Prior Art

In communication systems, information are through-connected or switched between terminal equipment, these information involving only one type of communication in the simplest case, but increasingly involving a number of types of communication of voice, picture, text or data. ISDN communication systems are particularly suitable for processing all types of communication. ISDN communication systems are already known which enable the simultaneous transmission of different types of communication in uniform digital structure under one telephone number, enabling transmission at a subscriber terminal via a single lead pair. In such an ISDN communication system, as described in ISDN im Buero, special edition of Telcom Report and Siemens Magazin COM, the entire system structure is based on function modules, i.e. the hardware is modularly constructed and the software is modularly structured. The essential modules are a through-connection module which comprises a digital switching matrix array and a central control device, as well as an operation and data module which serves for the control of the system-oriented periphery, as well as for storing system files. The term "receiver" has become common for modules such as the operation and data control module which respectively fulfills specific tasks by means of individual program controls usually realized by multi-processor arrangements. Further known servers, in addition to the operation and data server, are thereby a voice information server which offers the connected subscribers the possibility of re-routing their telephone connection to what are referred to as voice-mail boxes and a text and fax server with which, among other things, the conversion of a message from teletex to telefax is possible in cases in which there is no terminal equipment capable of teletex at the receiver. Further, the picture screen text servers for promoting service procedures for the communication type of picture screen text and special terminal receivers are also known which simultaneously process the request of a plurality of multi-functional terminals. By way of a bus system, the through-connection module is integrated with all other program control modules to form an overall system. The control of all communication activities is sequenced by the protocol of ISDN interfaces B+B+D.

A constant ready state is usually required of such communication systems. Special hardware and software modules serve to guarantee these requirements, these modules being referred to, overall, as dependability systems and their assistance being used in order to limit the effects of disturbances. Crucial jobs which the dependability systems are responsible for are therefore trouble recognition, trouble localization, trouble evaluation and trouble reports. In the known ISDN communication system, the dependability systems are overall structured such that a sub-module for the module dependability system is formed in each module. These sub-modules are specifically adapted to the hardware structure and to the job of the appertaining program control module, but are always respectively identical in basic design. Due to the central significance and the wide-ranging jobs of the actual through-connection module in comparison to the remaining server modules, the dependability systems sub-module of the through-connection module differs noticeably from the dependability systems sub-modules of the remaining program control modules. Since the general domain of the dependability systems of such a communication system also include jobs that go beyond the domain of the program control modules, a system dependability systems sub-module is hierarchically higher-ranking over the individual dependability system sub-module, this system dependability systems sub-module being preferably arranged in the through-connection module. As a necessary precondition for error texts being capable of being output at error output equipment, these error texts providing indications regarding type of error, location of error or, respectively, cause of error, the dependability systems sub-modules of the individual program control modules transmit error information to this system dependability systems sub-module.

SUMMARY OF THE INVENTION

In view of the foregoing, the object of the present invention is to take the different number and type of program control modules, of error output equipment, as well as a desired, different scope of error reports into consideration by way of a flexible error display concept.

To this end, and according to the present invention, the present invention proceeds on the basis of a modularly-structured communication system, particularly an ISDN communication system, comprising a through-connected module having a digital switching matrix array and a central control device and comprising an operation and data module serving for the control of the system-oriented periphery, as well as for storing system files, and further comprising further program control modules fashioned in a job-oriented manner, a system bus connecting all program control modules, program-control module-associated dependability systems sub-modules, and a system dependability systems sub-module in the through-connection module hierarchically higher-ranking than the dependability system sub-modules, as well as comprising at least one error output equipment.

In combination with this system, the object of the present invention is particularly achieved in such a system which is particularly characterized in that error information formed from error signals of the program control modules in the respectively assigned dependability systems sub-modules are transmitted to the system dependability system sub-module, compiled to form error reports in the latter based on defined ordering criteria, particularly based on error categories, and are transmitted to a signal sub-module provided in the administration data server in a system dependability sub-module associated data format, a signal distribution file having data for the report identification, for error categories and for the configuration of the output terminal and a signaling format file having data for the conversion of the system dependability system sub-module-associated data format into an administration data system operations-associated data format of signaling reports used for the formation of error text in the output equipment, being assigned the signaling sub-module.

The flexible error signaling concept created by the invention, within the framework of a modularly-structured communication system, enables the display of errors at arbitrary error output equipment without having information concerning the number, the location or the type of display equipment being available in the program control modules in which error signals are generated. Particularly as a consequence of the signaling distribution file, the possibility is thereby established of modifiying the sequence of the individual signaling reports in compilation to the sequence of the arrival of error information at the system dependability systems sub-module and, therefore, in particular, establishing different priorities for the output of error texts at the display equipment. This can be realized in a program-oriented simple manner of corresponding waiting queue routines. Another form of flexibility is particularly achieved by the use of the signaling format file with which different types of contents of error texts, for example in different languages, can be allocated to the identical error information of the system dependability systems sub-modules or, respectively, the same signaling reports of the signaling sub-module.

Overall, the farthest-reaching independence of the error signaling from the system structure and the condition of system expansion is achieved with the communication system of the present invention. As a result of the present invention, a precise trouble signaling which is the basis of a designational and fast trouble elimination is possible in a great variety of systems. The essential, basic idea of the concept underlying the present invention is a formation of sub-jobs for the error signaling and an intentional distribution of the sub-jobs onto the individual modules. This modular concept created for the error signaling in a modularly structured communication system provides respect possibilities of recognizing and analyzing error signals from the appertaining program control modules in the domain of the individual program control modules, wherefrom data concerning the individual malfunctions on which the error signals are based can be identified and error control steps can be initiated on the module level. Included in this general job of error handling, in addition to configuration measures and recovery measures, is also an error report to the module-overlapping system, dependability systems sub-module in the form of appropriate error information. The error information deriving from the module-associated dependability systems sub-modules are accepted, processed and ordered in the system dependability system sub-module and are then transferred to the signaling sub-module in the form of error reports, this signaling sub-module comprising an indirect (logical) access to the operations-oriented periphery of the operation and data module. In addition to the particulars regarding error location and type of error which are absolutely necessary, the error reports of the system dependability system sub-module can also encompass further particulars such as, for example, point in time of the occurrence of an error, initiated or recommended recovery measures, or error-explaining auxiliary data which are either hardware-oriented or software-oriented and create the possibility of generating and outputting arbitrary user-specified text signals.

With the assistance of the data stored in the signaling distribution file, these error reports are checked by the signaling sub-module and are edited for the individual signaling reports. In addition to the general, organizational data, such as those for pausability checking of the arrived data reports, and specific output data which effect the enable or delay or, respectively, suppression of the output of error texts, as well as signaling texts allocated to specific error categories contained in the error reports, a plurality of error fields for the error-associated data are provided in the signaling distribution file. Data for a report identification and for the types of output equipment are thereby contained in each of these error fields. The signaling format file, by contrast, serves the purpose of converting the system dependability system sub-module-associated data format of the error reports into a data format of signaling reports processible by the operating system of the operation and data module, these signaling reports being utilized for the formation of error texts in the output equipment.

In accordance with an advantageous feature of the invention, these signaling reports are supplied to output equipment-associated logic procedure sub-modules for the formation of error texts which can be output at the corresponding output equipment, being supplied thereto by way of a program operations technique control provided in the operation and data module which applies a connection and data transport control. The communication of the signaling sub-module in the operation and data module with the logic procedure sub-modules likewise provided in the operation and data module therefore does not occur directly, but via the central control of the operation and data module operation system of the operation and data module. This module operations system control therefore serves as a network mode which assumes the jobs of connection and data transport control for the signaling reports.

It is considered to be advantageous, in this context, that a designation information acquired from the signaling distribution file is output to the module operations control of the operation and data module as an exchange-oriented component part of the signaling information. This designation information, for example, can be fashioned as what is referred to as header of the data block representing the signaling information.

The signaling sub-module of the operation and data module, therefore, does not carry out any output equipmentspecific report editing of error texts to be output, but merely generates signaling reports which are converted in error texts with the assistance of the logic procedure sub-modules. This editing preferably occurs such that sub-module-associated text processors and a shared text pre-processor are assigned to all logic procedure sub-modules. All logic procedures sub-modules are respectively tailored to the equipment properties of a specific output equipment and, with the assistance of text modules input into the text pre-processor (man-machine interpreter), effects the conversion of the signaling reports into outputtable error texts and also effect the output of these error texts at output equipment.

Additional files having work data can be consulted for editing error texts, these work data being capable of being kept available in the data base of the operations systems of the operation and data module. Such a file can be interpreted as being sub-module sub-system allocated to the individual logic procedure sub-modules for converting text parameters of the signaling reports into error texts. However, it is also possible that a data base of a sub-module sub-system is realized on a disk storage and is allocated to the sub-module sub-system via a data management interface.

Particularly in view of the fact that different types of output equipment are employable in different numbers and at different locations, the flexibility of the error signaling can be increased in that the designation information output by the signaling sub-module to the module operations system control is allocated to a symbolic equipment and is converted by an equipment-allocated file into an output equipment-associated allocation information. The involvement of the suitable logic procedure sub-module for the equipment-associated formation and output of error texts is then advantageously achieved such that the logic procedure sub-module corresponding to the designation information is identified by means of the allocation information in a logic procedure allocation file.

The organizational program of the signal sub-module sequences in a state-initiated control fashion. It is provided in this context that the communication of the error reports from the system dependability system sub-module to the signaling sub-module occurs by way of an interface device which is equipped with a memory control in a mailbox manner. In order to be able to recognize irregularities in the program execution or, respectively, in the report exchange between the signaling sub-module and the module operations system control, the communication of further signaling reports from the signaling sub-module to the module operations system control is made dependent on the reception of an acknowledgment signal which is generated after the emission (step-out) of a signaling information from the mailbox of the module operations system control or, respectively, after a plausibility check of the signaling information. If this acknowledgment signal fails to arrive, further control steps can be initiated. This monitoring on the basis of an acknowledgment signal is preferably realized such that an acknowledgment signal is generated after the emission of signaling information from the intermediate memory of the interface device of the module operations systems control, this acknowledgment signal being transmitted to a further interface device assigned to the signaling sub-module and equipped with a memory controlled in a mailbox manner.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
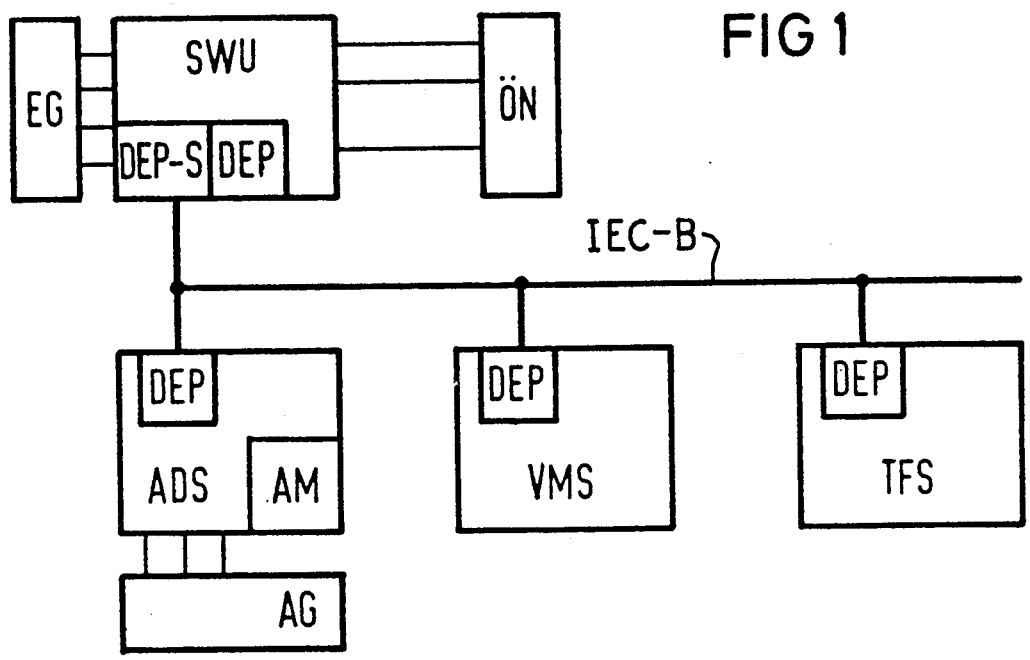
FIG. 1 is a block diagram of the module structure of a communication system and the inclusion of the operations dependability system into this structure.

A communication system is schematically illustrated in FIG. 1 with essential function modules, and contains a through-connection unit (switching unit SWU) having a digital switching matrix array (not shown) and a central multi-processor control (likewise not shown) as well as an operation data module (administration data server) ADS which is augmented by two further program control modules VMS (voice mail server), TFS (text fax server). The communication system enables the connection of arbitrary terminal equipment EG to one another and to public networks ON.

The administration data server ADS serves both for the start-up and the maintenance operations, as well as controlling the overall communications system. In the adminstration error data server ADS, therefore, all operations-oriented data and programs are stored and, in particular, the distribution of these programs to the different system units, including the remaining program control modules VMS, TFS is controlled therein. The two further program control modules VMS, TFS augment the actual switching function of the switching unit SWU by the intermediate storage of the messages intended for the individual terminal equipment EG.

With respect to further features of this communications system, one is referred to the article of G. Beckinger, et al entitled "Hardware Structure of HICOM Communication Computer" and the article by G. Ott, et al entitled "Today's HICOM Software for Tomorrow" and the article by J. Albath entitled "Integrated Servers in the HICOM ISDN Communication System," respectively published as Pages 56–64, Pages 65–72 and Pages 73–80 under the composite title "ISDN in the Office—HICOM", Special Issue of Telcom Report and Siemens Magazine COM, December 1985.

Such a communication system must be constantly operational ready. The dependability module has the job of also guaranteeing the high degree of availability in case of malfunction as well. The dependability system cannot prevent disturbances from occurring; however, it is structured and fashioned such that the effects of a malfunction remain limited.. On the basis of an assembly-accurate localization, the dependability module contributes thereto that disturbances are designationally and quickly eliminated in the system. The basic task of the dependability system are therefore:

Recognize malfunction;
Localize and evaluate malfunctions; and
Eliminate or, respectively, limit effects of a malfunction and report malfunctions.

Since the present invention essentially relates to only one aspect, i.e. to report localization and evaluated malfunctions to various output devices, the aspects of recognition, localization and evaluation of the malfunctions shall only be treated comparatively generally in the following description, whereas the aspect of reporting malfunctions shall be treated in greater detail.

In addition to the call processing software and the administration and maintenance software, the dependability forms the third software complex in the communication system. In terms of its organization, dependability follows the system structure of the communication system.

The dependability-oriented software of the overall communications system is oriented based on the module structure thereof, i.e. all program control modules ADS, VMS, TFS, as well as the switching unit SWU, each comprise individual dependability system sub-modules DEP (dependability modules). The dependability system sub-modules DEP are identical in terms of basic concept; however, they are individually adapted to the hardware structure and to the software structure of the respectively appertaining module SWU, ADS, VMS, TFS.

A system operations dependability sub-module (system dependability "module") DEP-S is provided in the switching unit SWU for the sub-aspects of the dependability systems of the entire communication system that extend beyond the actual module regions. All dependability-oriented sub-modules DEP of all program control modules SWU, ADS, VMS, TFS, including the switching unit SWU, are connected to the system dependability sub-module DEP-S by way of a system bus IEC-B. Error information are formed in the respective appertaining dependability system sub-modules DEP from error signals in the system modules SWU, ADS, VMS, TFS and are transmitted to the system dependability sub-module DEP-S by way of the system bus IEC-B. From the system dependability sub-module DEP-S, error reports acquired from the error information are transmitted to the operation and data module ADS and an operations technique sub-module AM (administration maintenance) of the operation and data module ADS converts the error reports into error texts adapted to the output equipment AG provided therefore. The programs of the dependability system belong to the application program of the communication system and are contained in resident fashion in the main memory of the respective program control module ADS, VMS, TSF or, respectively, in the switching unit SWU. The programming language is usually the higher programming language CHILL (CHILL 86 K) standardized according to CCITT.

The basic tasks, i.e. the functions of the dependability system are identical for, first, the switching unit SWU and, secondly, for the servers ADS, VMS, TFS; in terms of realization, however, the dependability software is adapted to the structure and to the requirements of the individual modules. Since the dependability programs in the switching unit SWU considered the majority part of the periphery and, therefore, the majority part of the hardware components of the communications system as well, the switching unit SWU shall be selected as an example for explaining the structure of the dependability programs.

Figure 2:
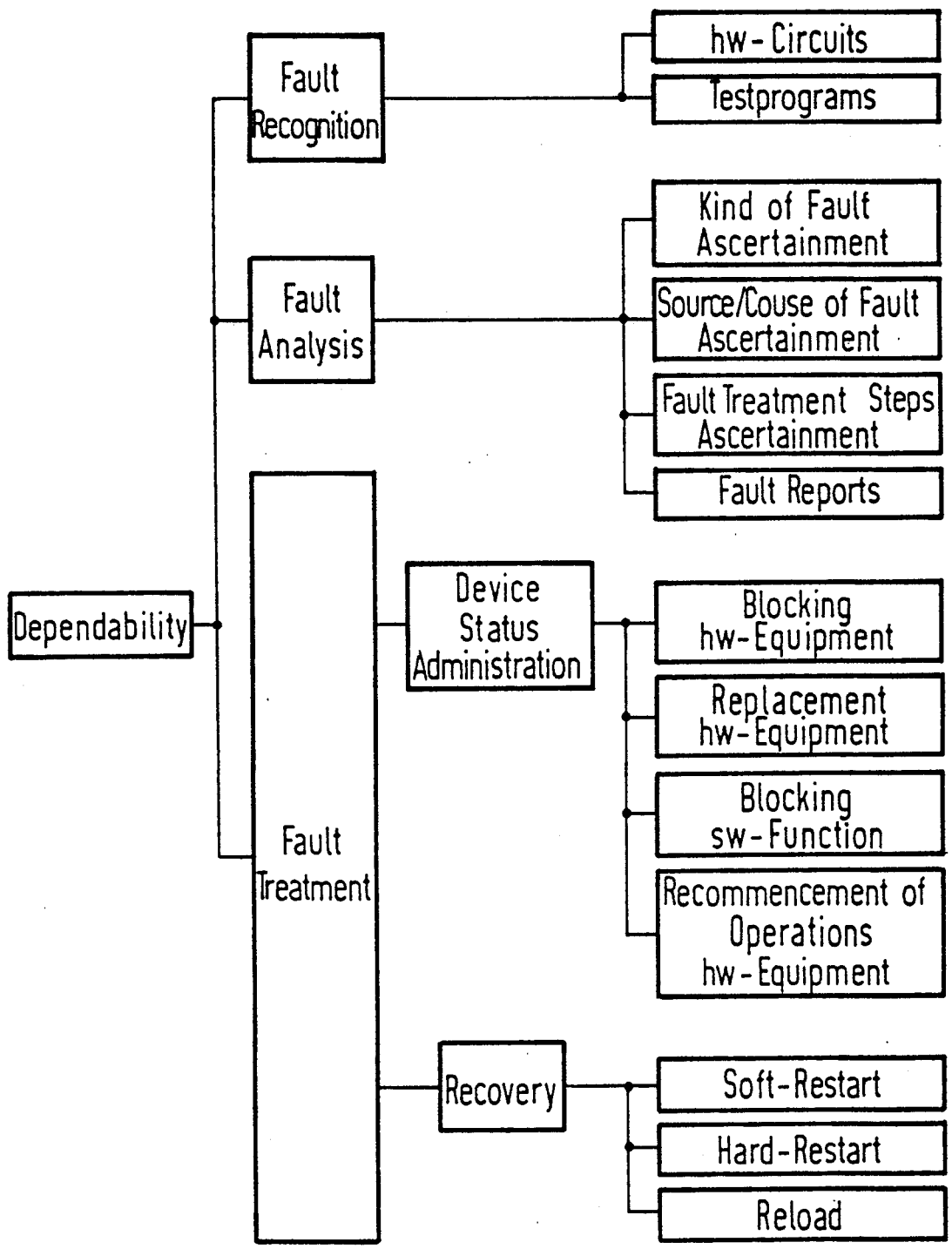
FIG. 2 is a functional diagram of the function of the dependability module.

The functions of the dependability system can be presented in the tree-like structure illustrated in FIG. 2. The three main branches:

fault recognition;
fault analysis; and
fault treatment, are re-encountered in the structure of the dependability software in the switching unit as well.

The fault recognition occurs on the basis of hardware and software. Hardware monitoring circuits secure regions of the system critical to the function that cannot be directly reached by software or where quick reactions are a principle concern. Moreover, they support the checking at the locations in the system where this is not possible via the normal operation function. Check programs, as background tests that do not disrupt the operations, see to the regular checking of the hardware functions of the system.

The fault analysis serves the purpose of "kind of fault ascertainment", i.e. of distinguishing whether a fault is sporadic or stationary, serve "Ascertainment of Source or Cause of Fault" (localization, serve "Fault Treatment Steps Ascertainment" and the fault reports with all required diagnosis data.

The fault treatment is intended to limit or, respectively, neutralize the effects of a fault. Suitable measures for this purpose are:

blocking;
replacement; or
recommencement of hardware circuits. cRecovery

The recovery brings the communication system into a defined condition, whereby fault effects are eliminated insofar as possible. The source of the fault, itself, is thereby not neutralized.

There are such recovery measures in various stages, for example as

Soft Restart

Sequence for the System User: through-connected, simple two's connections are preserved. All remaining connections are cleared down.

Hard Restart

Sequence for the User: all connections are cleared down, but can be set-up again by the user.

Reload:

All modules of the system are reset but are re-loaded with programs and data before the renewed run-up. This therefore corresponds to the initialization or, respectively, to the run-up after a voltage outage.

Figure 3:
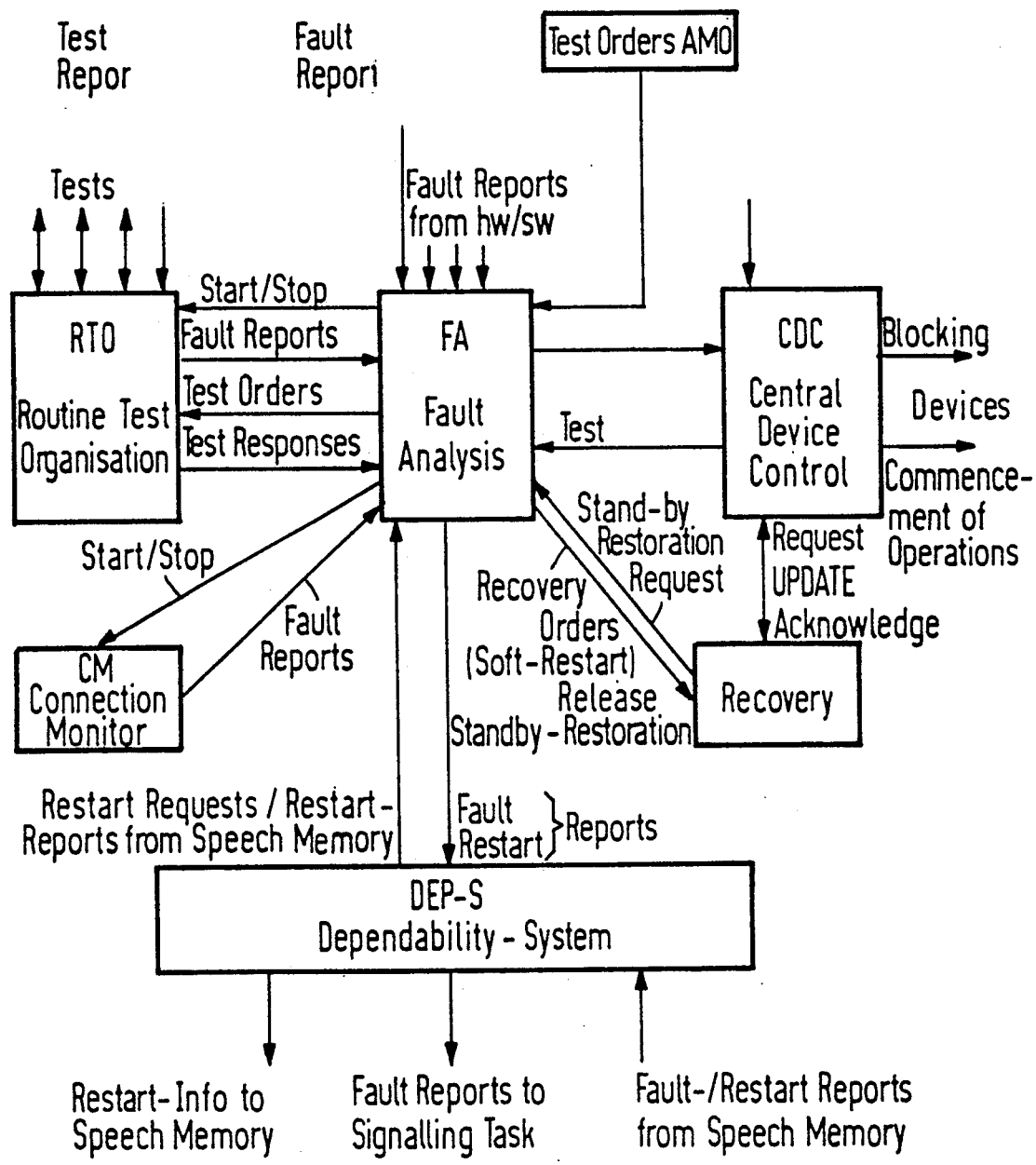
FIG. 3 is a diagram of the software complexes of the dependability modules in relation to a switching unit of the communication system.

FIG. 3 illustrates the dependability software complexes and software sub-complexes of the switching unit SWU. The arrows indicate the interface relationships with the complexes and subcomplexes relative to one another and toward the outside. The general functioning of the dependability may be seen from the drawing.

The fault analysis is the receiver of all fault and malfunction reports in the switching unit SWU. Fault reports can come from the routine test organization and from the connection monitor in the course of routine checking, but can also come from hardware monitor circuits, firm ware processors and other software complexes. In the framework of its analysis jobs, the fault analysis distributes test orders to the routine test organization RTO and receives the check results as responses. Dependent on fault, it distributes blocking orders or orders for commencements of operations to the central device control or initiates one of the possible recovery measures. In every case, however, the fault analysis transmits a fault report to the system dependability system DEP-S so that the fault is logged and can be signaled to a maintenance and alarm panel (see FIG. 10). The test orders that are component parts of administration and maintenance orders are also transmitted to the routine test organization via the fault analysis. In part with reference to further smaller figures, the structure and functioning of the sub-modules RTO, FA, CDC, CM, the recovery and the dependability system DEP-S contained in FIG. 3 shall be set forth below.

Dependability System DEP-S

The dependability system DEP-S is responsible for functions of dependability that extend beyond the module. It assumes those jobs that are not handled by the individual dependability sub-modules themselves. The dependability system DEP-S sequences in a central control of the switching unit SWU and is realized as a program without "status awareness". It represents a task in the sense of the operating system of the communication system and is essentially composed of the following component parts:

run-up part (run-up);
receiver mailbox;
sequence part (endless loop—do forever—with message
reception and discrimination between cases); and
processing procedures for every function.

The functioning shall be set forth below with reference to the structogram illustrated in FIG. 4.

The run-up part of the dependability system starts in an endless loop (do forever). In this loop, the receiver mailbox waits for a message. After the reception of the message (receive message), an event code is interpreted and one of the processing procedures is called in as a result thereof. Therein,-data are evaluated, tables are up-dated and messages are deposited at various receives as a reaction. A distinction is thereby made whether the dependability system DEP-S is located in the active computer or in a standby computer. The reactions are influenced by this fact. Given the appearance of an implausible message code, an "exception" is signaled. No special reactions are then provided or, respectively, required for the orderly continued run.

The active order treatment depends on the message content EVT-1 . . . EVT-9 given the existence of a "valid case event code".

For example, such messages are:

EVT-1: Fault of Initialization Message

The reports about identified faults are supplemented by the sum alarm via all program control modules. This sum alarm is a logical operation of all alarms of the individual modules. Moreover, the messages are forwarded unmodified for signaling to the administration data server.

EVT-3: Module State Answer Back

Every module reports its module status in response to a request of the system dependability module DEP-S. This module state is entered into a table and is potentially updated. This table forms the basis for the identification of the sum alarm.

EVT-T: GO-ACTIVE Enable Message of the Fault Analysis

This message informs the system dependability module DEP-S that it is to begin its active activity.

EVT-7: Network Outage

Figure 10:
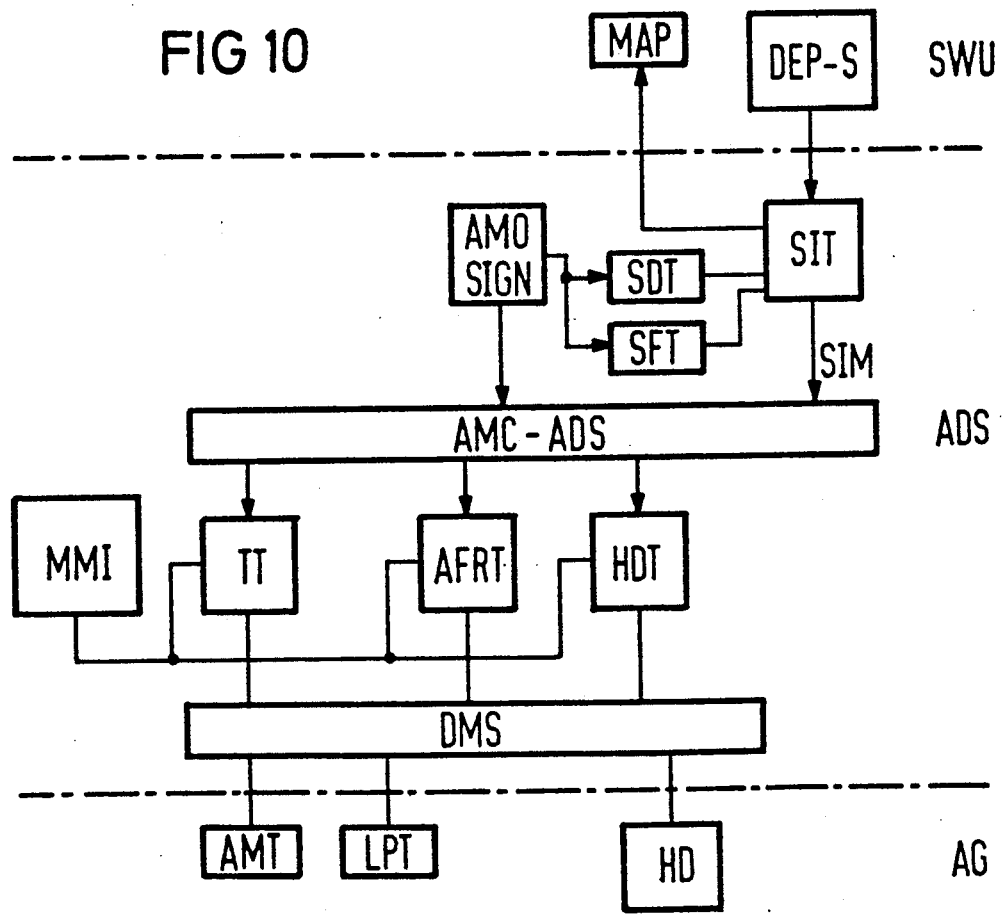
FIG. 10 is a schematic representation of the functional assignment of a signaling task to the switching unit or, respectively, to an operations and data module.

The network outage is identified by the dependability in the administration data server (FIG. 1) and is reported to the system dependability module DEP-S that transmits this report to the signaling sub-module (SIT, FIG. 10).

Routine Test Organization

The routine test organization RTO executes all hardware checks in the switching unit that are possible during on-going operation. The trigger for a check can occur either from the outside on the basis of the fault analysis or on the basis of the routine test organization RTO itself for routine checks. The check programs are thereby organized according to hardware regions. The routine test organization RTO, therefore, for example, contains check programs for digital terminal equipment, line trunk circuits, line trunk groups, signaling units, conference networks, PCM highways, memories, firm wire processors, IEC bus.

The routine test organization RTO can simultaneously process a plurality of test requests, whereby test for the central region, the switching matrix array region and the periphery region can be executed independently of one another and with different testing frequencies. The routine test organization RTO tests in a function-oriented manner. In order to acquire all functions of a hardware unit, a plurality of test programs must definitely be run. For example, in the case of line trunk units, the functions "µP Control and Communication with the System" is monitored by the program ", µP Test", but the communication functions are monitored with the program "Loop-Back Test".

The functions of the periphery are preferably monitored by test loops. The test sequence is similar to all test loops:

1. Insert test loop;
2. Mirror bit patterns given digital test loops, mirror test tone given analog test loops;
3. Compare transmission and reception data; and
4. Cancel test loop.

In the switching matrix network region, the function of the useful data channels (speech highways) is monitored by bit pattern mirroring at test loops in the respective line trunk unit assemblies. Valid in the central region for the processors contained there is that they are self-testing and that the routine test organization RTO interrogates them only for their presence.

The routine test organization RTO that tests the hardware functions has its test requirements ordered in a tree-like structure oriented according to the hierarchy of function units. This structure, with whose assistance the test are to be carried out or identified, shall be referred to below as the addressing catalog ADC. The operation of the addressing catalog ADC shall be set forth below with reference to an example illustrated in FIG. 5.

Figures 4, 5:
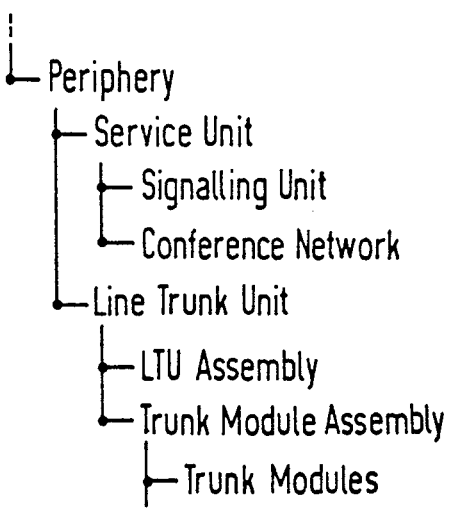
FIG. 4 is a structogram of the operation of the dependability system.
FIG. 5 illustrates a portion of an addressing catalog.

In the portion of the addressing catalog ADC shown in FIG. 5, every point represents a node of the tree to which a test request can proceed. All successor test requests are thereby contained in the respective test. When the routine test organization RTO receives the request to "check periphery", then it successively checks:

the service unit with a signaling unit SIU in a conference network CONF; and
   all line trunk units, whereby the line trunk unit circuits, the trunk module circuit and the trunk modules are tested per line trunk unit.

The routine test organization RTO is composed of three sub-complexes:
   Routine Test Organization Frame;
   Internal Test Program-RTP-I; and
   External Test Programs for Periphery RTP-PE.

The routine test organization frame RTO is organized in a plurality of programs:
   Main Tasks;
   Test Tasks;
   Addressing Catalog Processing; and
   Interface Program to RTP-I and RTP-PE.

The main task is the receiver of all external test requests. Moreover, it contains the control of the routine test request. It transmits all requests to the corresponding test task. The test task control the execution of a test request, whereby a total of seven different test tasks are established, four thereof being provided for routine testing, two for testing for designational request fault analysis and one for designational requests of the administration and maintenance. A plurality of test requests having different priority can therefore be sequenced simultaneously and independently of one another.

For selection of the required test program, the test tasks call in the program "addressing catalog treatment" that selects the internal test program to be executed next on the basis of the addressing catalog ADC and calls it in via the corresponding interface program.

Figure 6:
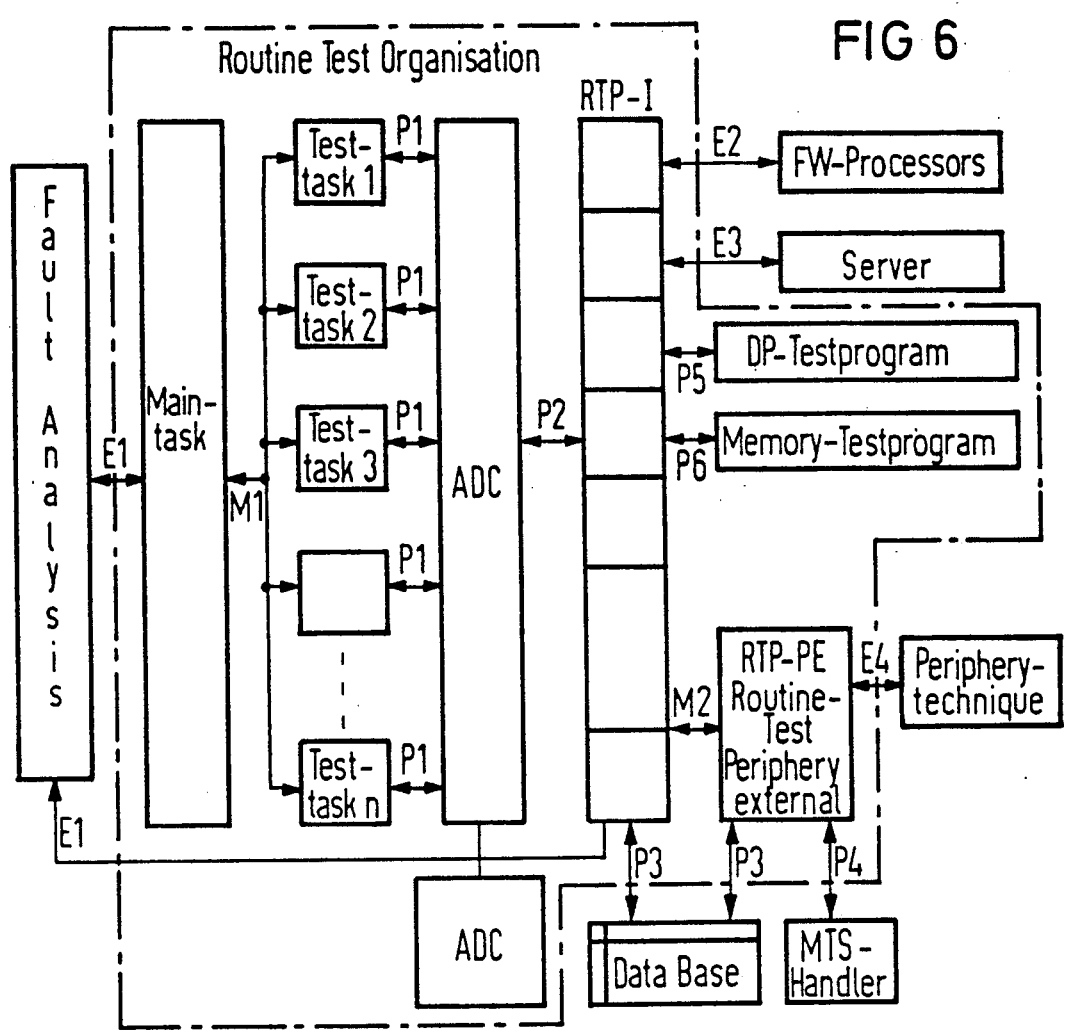
FIG. 6 is a schematic representation of the organization and the interfaces of a routine test organization.

The organization and the interface of the routine test organization RTO are illustrated in FIG. 6. The interfaces of the routine text organization RTO are divided into external message interfaces Ex, message interfaces Mx between the individual function units of the routine test organization RTO and procedure interfaces Px between the function units of the routine test organization RTO and common routines.

Figure 7:
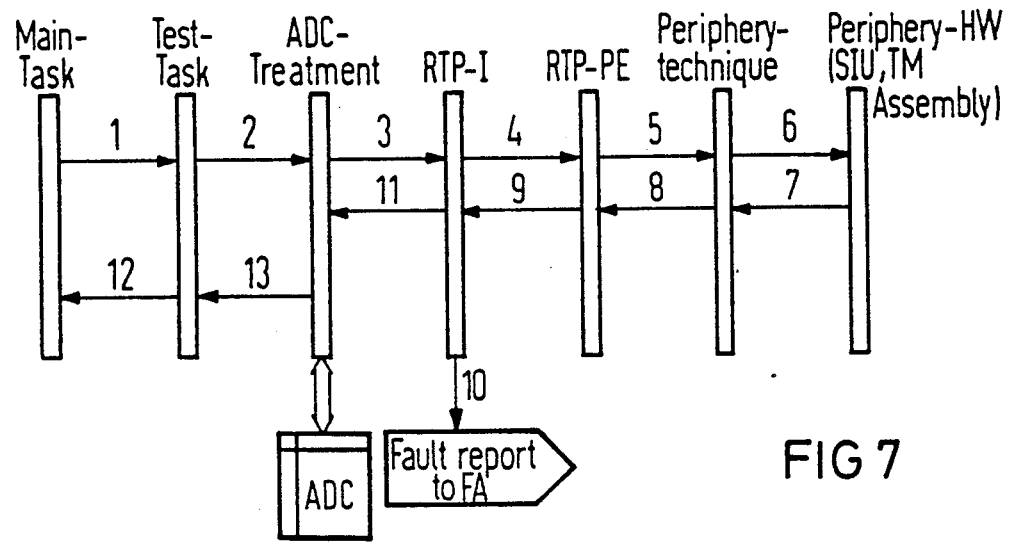
FIG. 7 is a schematic representation illustrating the operation of the routine test organization.

The functioning of the routine test organization RTO shall be set forth below with reference to an example of a routine test order "test trunk modules of all line trunk units" illustrated in FIG. 7.

1. The main task contains the control of the routine test. It generates the order "test trunk modules of all line trunk units" and sends it to the appertaining test task.

2. The test task enters all parameters into the task segment and calls in the procedure "address catalog treatment". This program identifies the address of the first line trunk unit and of the first trunk module assembly of the line trunk unit and, by recursive call-in, traverses the address catalog ADC until it receives the executable job "test all trunk modules of one assembly".

3. With this job, the appertaining routine test program RTP-1 for record testing is called in "RTP-PI-CIR". The parameters "line trunk unit number" and "trunk module assembly number" are transferred in the task segment.

4. The RTP-PI-CIR
   identifies the plurality of trunk modules of the assembly and the address of the first trunk module,
   checks whether the trunk module is free in terms of switching and is in operation, occupies the trunk module given a positive result,
   seeks and occupies the test paths between the signaling unit and the module for loop testing with the assistance of routing procedures, and
   compiles the test request for the loop test.

The RTP-PI-CIR sends the test request "analog e.g. digital loop testing" as a message to the task RTP-PE and waits for the reply from RTP-PE at the response mailbox of the test task.

5.–8. The test loop program for the task RTP-PE sends the request "for this test loop for trunk modules x" via the periphery technique to the recited trunk module assembly and waits for acknowledgment of the assembly, switches the routes in the respective switching matrix network and seeks a free call character receiver given analog trunk modules and checks whether the test bit pattern transmitter and receiver are free given digital trunk modules, and after the end of the test, this connects the test loop in the trunk module, the switching matrix network routes and the transmitter/receiver in the signaling unit.

9. RTP-PE sends a test result report back to the RTP-PI-CIR. Given blockages during the test execution, this report can already occur prematurely.

10. The RTP-PI-CIR evaluates the test result. Given a negative result, it sends a fault message to the message analysis. Given a positive result, it in turn releases the occupied trunk module and the routes. Subsequently, RTP-PI-CIR checks whether further trunk modules on the assembly are still to be tested. In the case the answer is yes, procedures 4–10 are repeated.

11. When all trunk modules of an assembly are tested, the RTP-PI-CIR returns to the program "addressing catalog treatment". This identifies whether further trunk module assemblies in the running line trunk unit are to be tested or, respectively, whether further line trunk units are also to be handled. When the answer is yes, procedures 2–11 are repeated.

12. When the test request has been completely worked off, the program "addressing catalog treatment" returns to the call-in location of the test task.

13. The test task sends a "test and report" to the main task that subsequently identifies the next routine test order.

Fault Analysis

The fault analysis part FA is the receiver of all fault reports in the switching unit. When the fault analysis part is informed of a fault, it must first identify whether it is a matter of a "sporadic event" or of a "stationary case". It therefore initiates a rerun test for the unit reported as faulty under the same conditions under which the fault occurred. When the fault is thereby confirmed, it is considered stationary; otherwise, it is considered sporadic. In general, a statistics fault events in a specific time is carried out. Only when the number of faults exceeds a defined value is the fault assumed to be stationary and treated accordingly.

When the fault analysis part FA has accepted a hardware fault as stationary, it must identify the faulty unit, i.e. must localize the fault location. Various measures are required for this purpose dependent on the region in which the fault occurred.

The fault analysis part is essentially composed of the main task portion of the interrupt treatment and of an administration and maintenance interface. The main task portion contains all programs for handling fault messages. It is composed of a task organization program and of the fault treatment programs for hardware and software. The fault treatment program are essentially realized in the form of status diagrams.

The interrupt treatment contains the interrupt handler for alarm interrupts that are conducted to a corresponding interrupt input of the data processor, as well as for the appertaining interrupt tasks.

The administration and maintenance interface has its own task in that it accepts the requests of the administration portion, adapts them to the message format of the dependability and transmits them to the destination process. Conversely, it converts the reply messages of the dependability to the administration part and forwards them thereto.

The fault analysis FA always handles only one fault at one time, whereby a distinction is made between central and peripheral faults. The task organization program of the fault analysis main task executes the following jobs:
- it empties the mailbox of the main task and distributes the messages to the appertaining processing programs (status diagram);
- it reinterprets the event codes of the messages into stimuli for the appertaining processing programs or, respectively, identifies these stimuli from the message data given messages of the routine test organization RTO; and
- it reads the status of the respectively appertaining processing program and calls it in.

Figure 8:
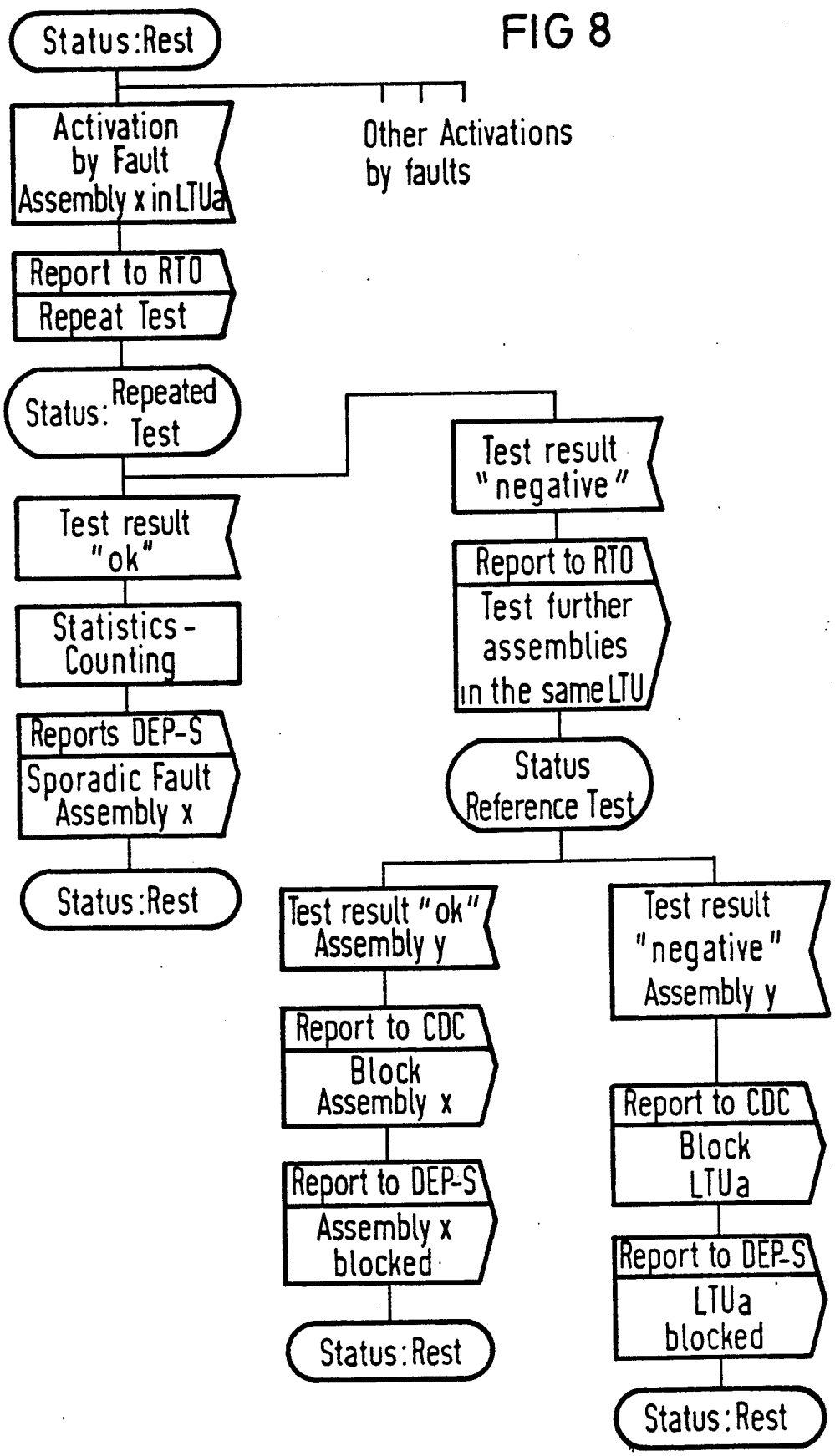
FIG. 8 is a status diagram of the operation of a fault analysis.

The sequence in a processing diagram (status diagram) derives from the tasks set forth above. For the sake of a better understanding, one should take reference to the self-explanatory status diagram of FIG. 8.

Central Device Control

The central device control has the job of administering the basic states of the hardware elements in the switching unit. In addition, the actual system expansion is identified during run-up of the switching unit, is compared to the reference system expansion and is correspondingly up-dated. The central device control CDC receives requests for status administration from the administration portion, from the dependability (fault analysis) portion, from the periphery technique and from a run-up task in the switching unit.

In program-oriented terms, the central control device CDC is composed of the following function units:
Task Organization Program (CDC-TOP); and
A device handler for each hardware type element, a device handler being composed of a control part and a status diagram.

The task organization program of the central device control receives the request for apparatus administration and transmits the same to the appertaining program.

The device handlers execute the request. They are constructed in accordance with the system structure and exhibit the same dependencies a the hardware elements of the switching unit. A request to a device handler can effect successor requests to subordinated device handlers that must first be carried out before the status change is carried out at the original level. The administration of these "reports and acknowledges" is assumed by the control parts of the administration programs.

The demands made of the central device control CDD are solved by uniform apparatus states and uniform requests as well as by the "module principal" of the device handler and its state orientation. Examples of device states are:
a) ready: Element is in operation, can be used for normal switching jobs;
b) defect: Element is non-operational, it was inhibited by the fault analysis; and
c) neq, "not equipped"; The element is not equipped in the system.

The basic states can occur in defined combinations. Not all hardware elements can assume every state.

Figure 9:
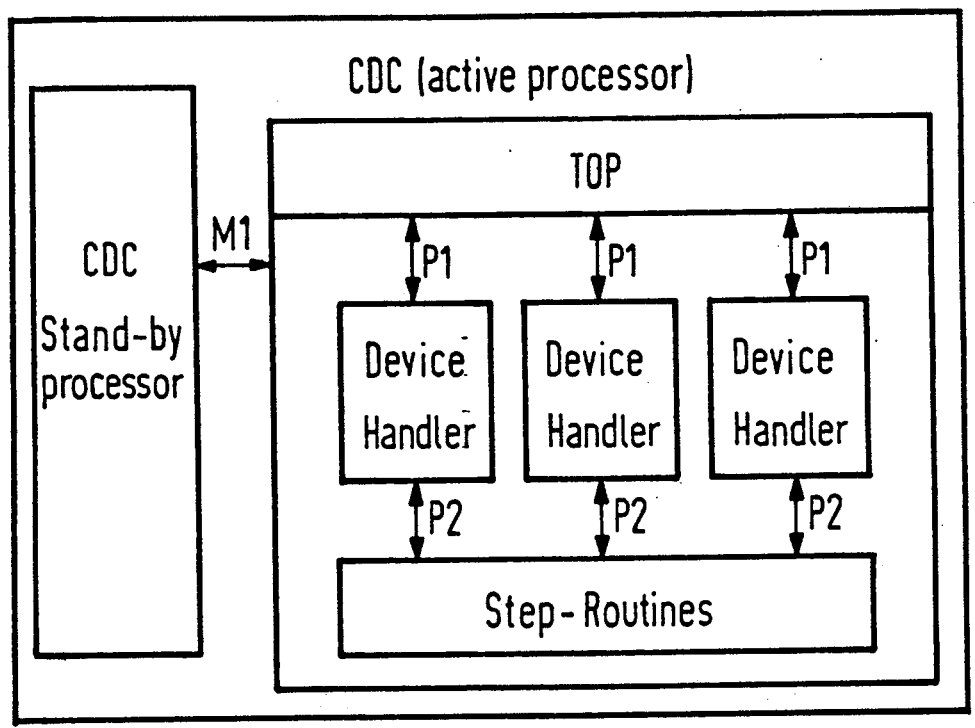
FIG. 9 is a schematic representation of the functioning of a central device control.

The central device control CDC administers the device status on the basis of requests that can be divided into two groups (restore and remove). The fundamental functioning of the central device control and its internal interfaces may be derived from FIG. 9. The interfaces Pl thereby respectively represent procedure interfaces to the device handlers, i.e. that the task organization program TOP of the central device control calls in the appertaining status transition procedures. The interfaces P2 are procedure interfaces to the step routines, i.e. the device handlers call step routines in during a status transition.

Connection Monitor

During call set-up, all devices and routes participating therein are written in the dynamic memories assigned to them as being "occupied" and are in turn, released given call clear-down. It can occur that the device or route is occupied for no reason or remains erroneously occupied as a consequence of software error or hardware faults. The connection monitor CM covers all parts that can be blocked in the switching-oriented operation. The connection monitor CM initiates the release the erroneously-occupied memory parts and respectively generates a fault report that meaningful contains some data from the affected memory in order to facilitate the error search for the switching technician.

In addition to containing its status information, each memory to be monitored can preferably contain a connection control bit that is set at every switching-oriented occupation of a memory. This bit is evaluated and reset only by the connection monitor CM.

Recovery

The recovery software serves in the handling of hardware and software faults in the control of the switching unit. Given serious outages in the hardware, for example processor malfunctions, or fault in the software, for example inconsistency of the data, the fault analysis has various possibilities of eliminating the influence of the malfunction. Such possibilities, as already set forth, are soft restart, hard restart and reload.

The recovery is composed of a total of seven function units, whereof the procedures safe and unsafe connection are realized as data base access routes. The remaining function units are tasks in the sense of the operating system that are coupled to one another by message interfaces insofar as possible. A distinction is thereby to be made between functions in the active control and functions in the standby control.

The functional allocation of a signaling sub-module SIT (signaling tasks) to the switching unit SWU or, respectively, to the operation and data module ADS and to the output equipment AG shown in FIG. 10 shows that the signaling sub-module SIT accepts fault reports from the system dependability sub-module DEP-S arranged in the switching unit SWU. For the output of correspondingly generated signaling messages, the signaling sub-module SIT has recourse to some data files, whereof a signaling distribution data file SDT and a signaling format data file SFT containing data related to the layout of the fault texts to the output are shown. The two data files SDT, SFT are adapted to the system structure and to the plurality and type of output equipment via signaling administration orders AMO-SIGN (administration orders-signaling). An alarm field MAP (maintenance alarm panel) in the switching unit SWU is available for the output of alarm messages given the occurrence of partial outages or total outages of important system components. Further signaling messages SIM are not directly output to the logic procedure sub-module region LDU (logical device unit) but are communicated to the logic procedure sub-modules TT, AFRT, HDT by way of a module operations technique control AMC-ADS of the operation and data module ADS. As possible output procedures, the exemplary embodiment shows a terminal procedure TT (terminal task) for outputting fault texts to an administration terminal AMT (administration maintenance terminal) or to a control device LPT (line printer tasks), a fault report procedure AFRT (automatic fault report tasks) for outputting fault signalings, particularly for portraying fault statistics, to a central service data center (not shown) and a memory procedure HDT (hard disk task) for outputting fault texts to a disk storage HD. The output of the fault text generated in the individual procedures does not occur directly at the output equipment AMT, LPT, HD, but occurs via a data management control DMS (data management system). The formation of equipment-adapted fault texts on the basis of individual logic procedures TT, AFRT, HDT occurs by way of a pre-processor MMI (man machine interpreter) allocated to all procedures with which specific fault texts are generated or, respectively, desired modifications can be undertaken in a simple manner.

Figure 11:
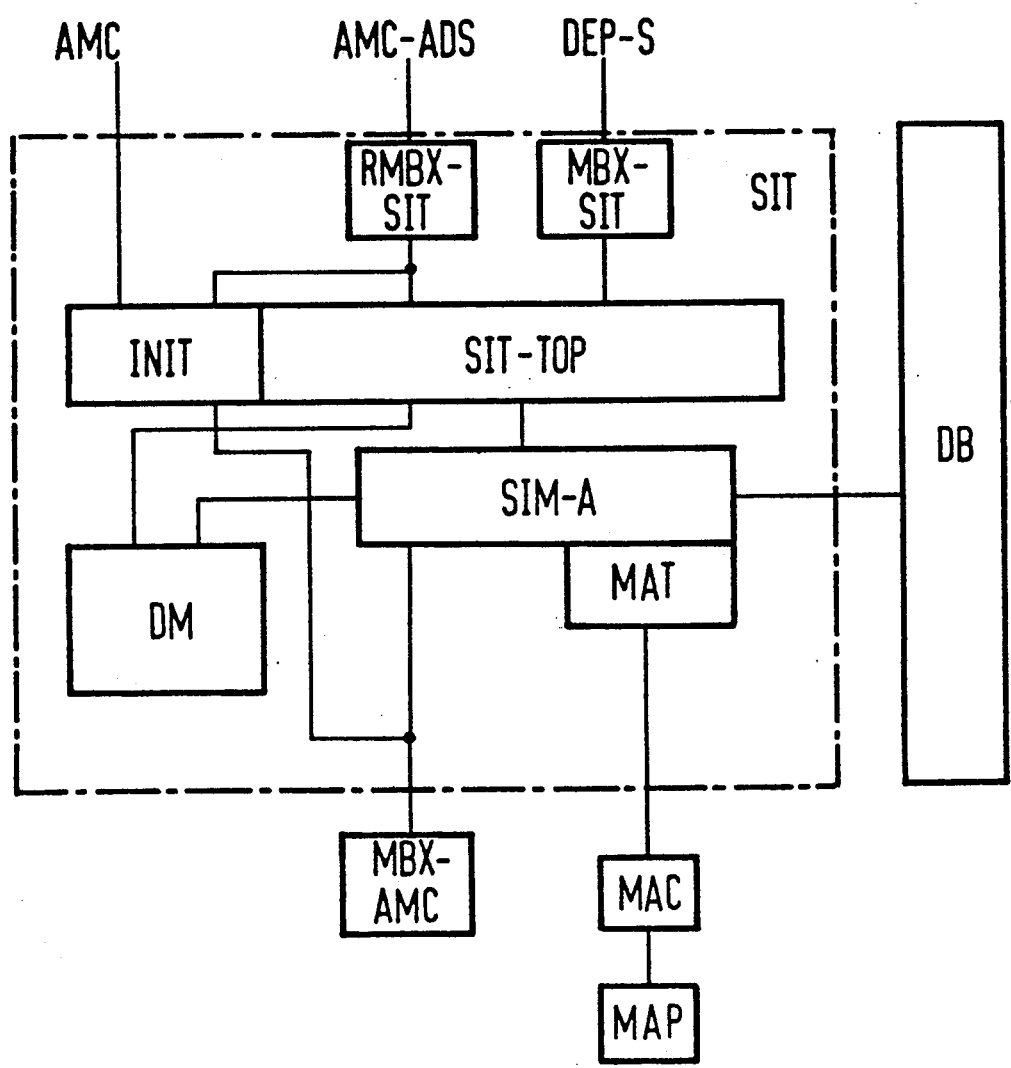
FIG. 11 is a schematic representation of the function structure of the signal in task.

FIG. 11 shows the function structure of the signaling sub-module SIT and the interfaces to other system components. Significant component parts of the signaling sub-module SIT are an initialization routine INIT that is under the control influence of the operations technique control AMC-ADS of the operation and data module ADS as well as an organization program SIT-TOP that represents the operation program of the signaling sub-module SIT. The data required therefor are contained in a data module DM. A further significant component part of the signaling sub-module SIT is a distribution-oriented and format-oriented editing routine SIM-A for the signaling messages. This editing serves the purpose of pre-adaptation of the data scope and of the data format of the signaling messages to the following formation of fault texts (see FIG. 2). A program written in the standardized, self-explanatory program language CHILL (CCITT high level language) for editing (preparation of) some signaling messages SIM selected by way of example is provided in the attached Appendix Annex I. Signaling messages that are output to a control device MAC for the alarm field MAP are generated with a program procedure MAT (maintenance and alarm tasks).

Controlled by status stimulus, the organization program SIT-TOP of the signaling sub-module SIT runs in an endless loop. The stimuli or output from the system dependability sub-module DEP-S in the switching unit to a stimulus mailbox MBX-SIT. The output of edited signal messages to the operations technique control AMC-ADS of the operation and data module occurs via a stimulus mailbox MBX-AMC thereof. The signaling sub-module SIT does not accept the next fault message of the system dependability sub-module DEP-S from the stimulus mailbox MBX-SIT until after the arrival of an acknowledgment from the operations technique control AMC-ADS at the mailbox RMBX-SIT. A further interface of the signaling sub-module SIT exists to a data base DB of the operation and data module.

A control program for the signaling task, written in CHILL, is provided in the Appendix, Annex II. Respective references to the essential "process phases" are inserted at the right next to the sequences in this program for further explanation.

The signaling distribution table SDT serves for testing and identifying the organizational data for the individual signaling message.

The table has the mode: DA-M-ST-SDT-ARY.

The scope of the table is defined by the message DB-M-RS-EVT-SET defined by the system dependability module DEP-S. Every SET value represents a fault category, whereby the table contains the following elements per fault category:

| | |
|---|---|
| EVT-CODE | for plausibility checking; |
| FREE | as identification for the signaling enable; |
| E-M-IDX | event mask index for selecting the signaling text allocated to the fault category; and |
| SEV-ARY | fault field for the fault-associated data. |
| Every fault field element has the following structure: | |
| SEV | SET value of the fault as search criterion |
| S-FREE | identifier for the output of the fault; |
| MSG-ID | message identification (fault number, reference number) for the header line of the fault reports; |
| AFR-PRIO | message priority of the automatic fault report task; |
| DEV-ACT | currently valid configuration for the symbolic output equipment; |
| DEV-CONF | standard configuration of the symbolic output equipment; and |
| SEV-M-IDX | sub-event mask index for the selection of the signaling test allocated to the fault. |

The table is initialized for the fault categories having the allocated faults. When the system dependability module DEP-S supplies fault messages for which no corresponding fault field elements are defined in the signaling distribution table, the signaling task SIT signals a fault message having the message identification F1010 and fault category as well as fault as a whole number in a decimal format.

The signaling format data file SFT serves for the conversion of the format SET values (DB-M-RS format SET) from the fault message of the system dependability module DEP-S into fault report format mask indices that the pre-processor MMI (man-machine interface) supplies during the production of the sub-system for message texts. By way of this index and an assigned variable field table (V-FIELD-TBL), the pre-processor MMI called in by one of the logic procedures sub-modules (logical device unit LDU), can execute the data transformation into a man-machine language for a signal message.

The signaling format data file has the mode: MK-M-SIM-FORM-ARY.

The signaling messages edited by the fault messages differently structured in format that are received by the signaling task and that are to be distributed to defined output equipment contain the following elements for easy visual and machine interpretation:

unequivocal message identification with key identifier;
fault category/fault location;
fault type;
measures undertaken;
date and time of day; and
supplementary information, including
message priority for the interpretation,
fault diagnosis results for hardware faults and
software errors, and
fault-associated auxiliary data.

The scope and the different natures of the information compels, to the classification and formatting of the signaling messages, what are referred to as the signaling formats.

The signaling formats are composed of:
header line:
auxiliary lines for message-explanatory information, given:
 hardware faults with integration location information,
 software errors with program information, and
 text messages having user-specific texts; and
given existing auxiliary lines, optional auxiliary data lines.

EXAMPLE:

F for fault, H for reference, U for undefined fault element.

The message priority for the automatic fault report is recited in columns 7 and 8. The priorities therefore are composed of a code identifier and of a one-place decimal number (see the above example E4). The following code identifiers are defined: E for equivocal messages, M for unambiguous messages, 1 . . . 8 priority number range.

Columns 10–14 indicate the message running number that is merely provided for ordering an address aid of the output messages (see the above example N0043).

Columns 16–23 contain a particular for the initiated action (OUT SERV). Columns 25–29 show the address of the module outputting the fault report (BPR). Columns 31–38 or, respectively, 40–61 indicate the fault category (event code) or, respectively, the fault (sub-event code) (see the above example: LCU or, respectively, LCU CENTRAL ERROR).

Columns 64–71 or, respectively, 73–80 serve for indicating the date and time of day of the fault message. (See the example: not illustrated end of message).

In a similar fashion, the individual columns in the auxiliary lines or, respectively, the auxiliary data lines are allocated to specific information.

The generating of the fault messages occurs with the assistance of the band-machine language (MML) recommended by the CCITT, i.e. in that the signaling message is output by the signaling task or brought into the above-described form with the assistance of the main-machine interpreter (MMI). The output texts are standardized texts oriented to standardize events, whereby the texts characters are deposited in the text part of the interpreter data or in the text part of the Hardware Faults

```
F7551  E4  N0043   OUT    SERV   BPR   LCU          LUC CENTRAL ERROR
   ┌─P105:SM              TF11:013     Q2051        VCD BG201 FW:1333-A
   ├─P105:2M              TF11:03702Q2036           LCC BGS01 FW:A333-A
   │  ┌─0103   0918       0000 0000 0000 0000 0000 0000
   │  │
   │  └─── auxiliary data line
   │
   └─── auxiliary lines (HW fault with integration location information)
   │
   └─── Header line
```

Software Faults

```
F6063  E4  N3456    A1        CMS        MES HEAD FAULT
   ┌─CC:37011  EC:35001  UA:0000:A700:013E  SP:0000:A308:0201  LD:
   │
   └─── auxiliary lines (SW errors with program information)
   │
   └─── Header line
```

The output formats are designed for the standard output on an operations-oriented terminal (BT) having 80 characters per line, whereof the respectively first 62 columns are reproduced in the above examples.

The header line is equally valid for hardware and software messages. Every message field has a specific plurality of columns assigned thereto. Therefore, for example, the first five columns are provided for reproducing the message identification; every output message contains an equivocal message identification composed of code identifiers and message numbers (see the above example F7441). Following code identifiers are defined:

MMI functions and are read out, compiled and sent off as a complete text train by the MMI function. The output trains are output to the interface data management system that undertakes an adaptation to the signaling method and to the user service of the connected terminal equipment. As a level 2 program in the sense of the ISO-7 level module, this interface forms the function conversion of the hardware or, respectively, firm ware. In the administration data circuit, the interface simultaneously represents the connecting element between the function of the levels 3 and 4 and the functions of the line periphery. Data outputs that are transmitted from level 3 programs are thus controlled in a device-associated manner.

The essential functions of the data management system are:

for offering periphery data for the elementary functions such as transmission rate, length of start or, respectively, stop step and parity;

control of the print image for different portrayal of outputs on printers or picture screen according to this rule; and delay of the data output given printers having low baud rates and without internal intermediate buffers.

The following appendix is written in the standardized, self-explanatory program language CHILL for editing of some signaling messages (Annex I) and for signaling (Annex II).

We claim:

1. A modulation communications system with a system-oriented periphery and comprising: a switching unit including a digital switching matrix and a central control device; an administration data server for controlling the system-oriented periphery and storing system files; a plurality of program control modules each constructed in a job-oriented manner; a system bus connecting said switching unit, said administration data server and said program control modules; a plurality of program control module-associated system dependability sub-modules in the respective program control modules, in said administration data server, and in said switching unit; a system dependability systems sub-module in said switching unit hierarchy higher ranking over said system dependability sub-modules; at least one output device including display equipment operable to display errors; error information formed from error signals of the program control modules of the switching unit and said administration data server in respectively assigned system dependability sub-modules being transmitted to said system dependability systems sub-modules of said switching unit, said system dependability systems sub-module of said switching unit responsive thereto to form error reports based on defined ordering criteria including error categories; and said administration data server including a signaling sub-module, a signaling distribution file associated with said signaling sub-module and having data for the report identification, for error categories and for the configuration of the output device, and said error reports being transmitted to said signaling sub-module in a system dependability sub-module data format including a signal format file associated with said signaling sub-module and having data for the conversion of the system dependability sub-module data format into an administration data server system data format of signaling reports used for the formation of error texts in the output device assigned to said signaling sub-module.

2. The communication system of claim 1 and further comprising: a module operations system control in said administration data server for receiving signaling reports and operable to provide a connection and data transport control for the formation of error texts to be output to the display equipment.

3. The communication system of claim 3 and further comprising: logical procedure sub-modules having at least one sub-module system assigned thereto for the conversion of texts parameters of the signaling reports into error texts.

4. The communication system of claim 3 and further comprising: text processors assigned to said logical procedure sub-modules; and a text pre-processor connected to be shared by said logical procedure sub-modules.

5. The communication system of claim 4 and further comprising: a data management interface; and a disk memory comprising a data base assigned to a sub-module via said data management interface.

6. The communication system of claim 5 comprising: means for producing switching-oriented component portions of signaling reports to said module operations systems control.

7. The communication system of claim 1 and further comprising: means for converting destination information into output device assignment information.

8. The communication system of claim 1 comprising: a logical procedure sub-module corresponding to destination information; and a logical procedure assignment file identifying assignment information.

9. The communication system of claim 1 wherein: the communication of error reports from the system dependability sub-module to the signaling sub-module occurs via an interface device including an intermediate memory operated as a mailbox.

10. The communication system of claim 1 wherein: a module operations system control in said administration data server for receiving signaling reports and operable to provide a connection and data transport control for the formation of error texts to be output to the display equipment; and the communication of signaling reports from the signaling sub-module to the module operations systems control occurs by way of an interface device including an intermediate memory operated as a mailbox.

11. The communications system of claim 10, comprising: a further interface device assigned to the signaling sub-module, including a memory operated as a mailbox; and after reading a signal report for said intermediate memory of said interface device, an acknowledgement signal is generated and communication to said further interface device.

12. A module communications system with a system-oriented periphery and comprising: a switching unit including a digital switching matrix and a central control device; an administration data server for controlling the system-oriented periphery and storing system files; a plurality of program control modules each constructed in a job-oriented manner; a system bus connecting said switching unit, said administration data server and said program control modules; a plurality of program control module associated system dependability sub-modules in the respective program control modules, in said administration data server and in said switching unit, said system dependability sub-module in said switching unit hierarchically higher ranking over said system dependability sub-modules of said program control modules and said administration data server; at least one output device including display equipment operable to display errors; error information formed from error signals of the program control modules and said data administration server in respectively assigned system dependability sub-modules being transmitted to said system dependability sub-module of said switching unit, said system dependability sub-module of said switching unit responsive thereto to form error reports based on defined ordering criteria including error categories; said administration data server including a signaling sub-module, a signaling distribution file associated with said signaling sub-module and having data for the report identification, for error categories and for the configuration of said output device, and a signaling format file associated with said signaling sub-module and having data for conversion of the system dependability sub-module data format into an administration data server system data format of signaling reports used for the formation of error texts in the output device assigned to said signaling sub-module.

* * * * *